US007363786B2

(12) United States Patent
TerHaar et al.

(10) Patent No.: US 7,363,786 B2
(45) Date of Patent: Apr. 29, 2008

(54) LOCKING ASSEMBLY FOR A TRUCK CARGO BED CLOSURE

(76) Inventors: David Jay TerHaar, 4685 44th St., Holland, MI (US) 49423; David Lee TerHaar, 4413 128th Ave., Allegan, MI (US) 49010

( * ) Notice: Subject to any disclaimer, the term of this patent is extended or adjusted under 35 U.S.C. 154(b) by 171 days.

(21) Appl. No.: 10/975,853

(22) Filed: Oct. 28, 2004

(65) Prior Publication Data

US 2006/0090527 A1 May 4, 2006

(51) Int. Cl.
*B60R 25/02* (2006.01)

(52) U.S. Cl. ........................ 70/208; 70/210; 292/336.3; 292/216

(58) Field of Classification Search .................. 70/208, 70/210; 292/DIG. 29, 42, 43, 216, 336.3; 296/106, 191

See application file for complete search history.

(56) References Cited

U.S. PATENT DOCUMENTS

| | | | | |
|---|---|---|---|---|
| 5,058,258 | A | 10/1991 | Harvey | 29/401.1 |
| 5,295,726 | A | 3/1994 | Carter et al. | 296/191 |
| 5,688,017 | A * | 11/1997 | Bennett | 296/100.17 |
| 5,852,943 | A * | 12/1998 | Dutka et al. | 70/237 |
| 5,941,104 | A * | 8/1999 | Sadler | 70/208 |
| 5,984,383 | A * | 11/1999 | Parikh et al. | 292/121 |
| 5,987,942 | A * | 11/1999 | Ichinose | 70/208 |
| 5,987,943 | A * | 11/1999 | Verga et al. | 70/208 |
| 6,192,725 | B1 * | 2/2001 | Watson et al. | 70/208 |
| 6,209,366 | B1 * | 4/2001 | Zagoroff | 70/208 |
| 6,354,650 | B2 | 3/2002 | Terhaar et al. | 296/106 |
| 6,406,075 | B1 * | 6/2002 | Rice et al. | 292/336.3 |
| 6,427,500 | B1 * | 8/2002 | Weinerman et al. | 70/135 |
| 6,454,321 | B1 * | 9/2002 | Parikh | 292/216 |
| 6,497,445 | B1 * | 12/2002 | Combs, II | 296/100.07 |
| 6,523,869 | B1 * | 2/2003 | Jensen et al. | 292/336.3 |
| 6,527,330 | B1 * | 3/2003 | Steffens et al. | 296/100.07 |
| 6,530,250 | B1 * | 3/2003 | Linares et al. | 70/208 |
| 6,543,821 | B1 * | 4/2003 | Weinerman et al. | 292/123 |
| 6,883,855 | B2 * | 4/2005 | Chverchko et al. | 296/100.09 |
| 7,052,071 | B2 * | 5/2006 | Mulder et al. | 296/100.07 |
| 7,065,992 | B2 * | 6/2006 | Talukdar et al. | 70/208 |
| 2003/0111845 | A1 * | 6/2003 | Sadler | 292/35 |
| 2003/0230909 | A1 * | 12/2003 | Melius et al. | 296/98 |
| 2004/0074267 | A1 * | 4/2004 | Linares | 70/208 |
| 2005/0284199 | A1 * | 12/2005 | Gulley et al. | 70/208 |
| 2006/0082161 | A1 * | 4/2006 | Minix | 292/28 |

* cited by examiner

*Primary Examiner*—Suzanne Dino Barrett
(74) *Attorney, Agent, or Firm*—Flynn, Thiel, Boutell & Tanis, P.C.

(57) ABSTRACT

A locking assembly for a truck bed closure includes an internal frame mounting a slider having a vertical portion with a dog-receiving aperture, a disk rotation flange, a manual actuation flange and a motor-actuator flange, and a horizontal portion with a pair of keyhole apertures for receiving the mounting studs. a hollow lock cylinder bushing secured to the mounting plate internally and rotatably receives a shaft and a lock tumbler. Rotation of the shaft by turning an exterior handle unlatches the truck bed closure. The interior end of the tumbler mounts a locking dog. Pivoting of the lock tumbler rotates the locking dog to shift the slider between the locked and unlocked positions. A lock disk fixed to the shaft engages the slider in the locked position, preventing unlatching. An electric actuator can be connected to the slider, enabling shifting of the slider from a wired or wireless remote switch.

26 Claims, 15 Drawing Sheets

FIG. 8A
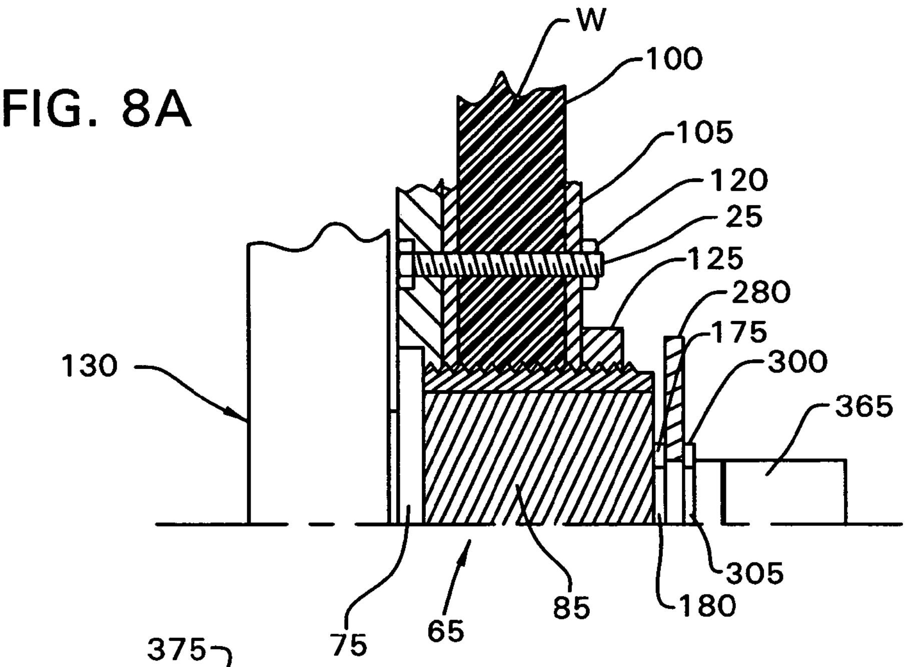
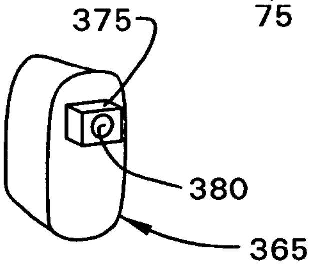
FIG. 8B
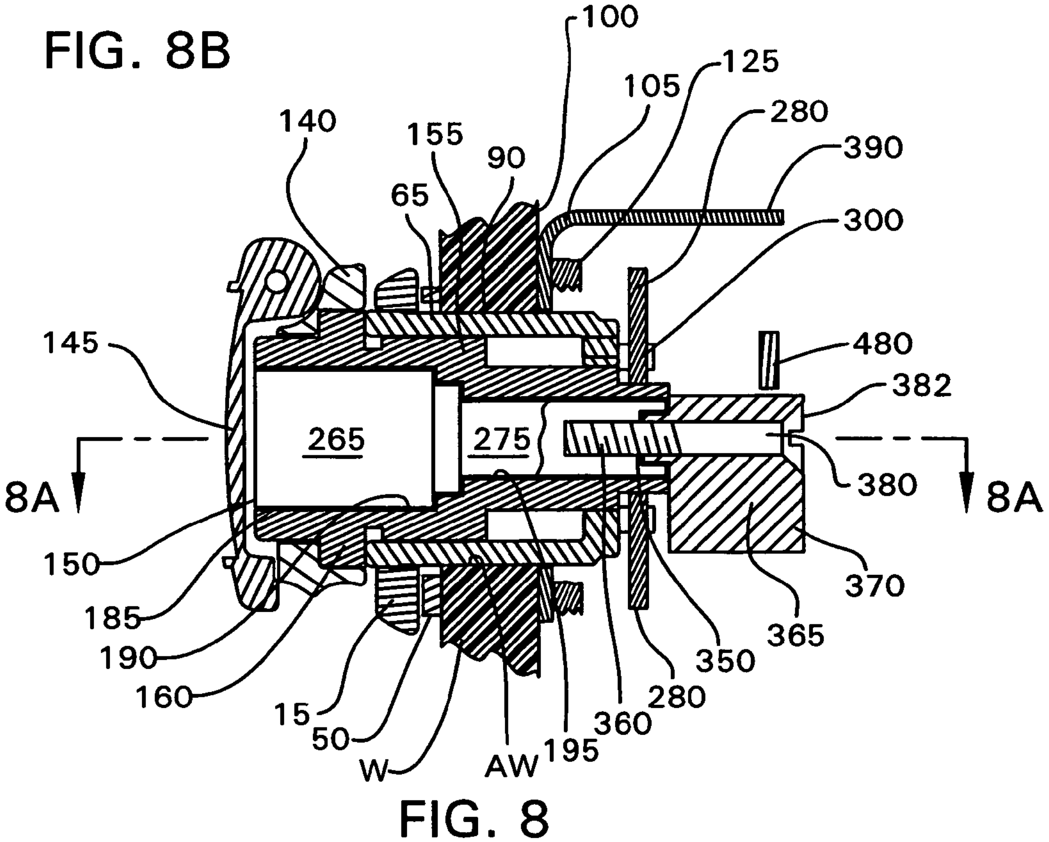
FIG. 8

LOCKING ASSEMBLY FOR A TRUCK CARGO BED CLOSURE

BACKGROUND OF THE INVENTION

1. Field of the Invention

The invention relates to locking mechanisms for truck bed closures, or more specifically to manual and/or electrically actuated locking mechanisms for truck bed caps or tonneau covers.

2. Related Art

Trucks, e.g. conventional pickup trucks, typically have a cargo bed bounded by a bottom wall and one or more sidewalls and an open portion through which cargo is received. It is common, to protect such cargo against weather, theft, etc., to selectively close such open portion with an openable closure, such as a cap or tonneau cover. Such truck caps and tonneau covers are known to have a locking mechanism that, unlike conventional passenger vehicle doors, are typically simple mechanical devices securing the cover or lift gate by using a pivoting handle actuating a rod or cable to release a latch. The pivoting handle typically has an internal lock tumbler that allows the handle to pivot when placed in the appropriate orientation.

An improvement to this arrangement was presented in U.S. Pat. No. 6,354,650, having common inventorship with the instant disclosure, wherein an electric actuator was arranged at the latch, whereby the latch anchor points were displaced from the latch in order to release the latch without the need to pivot the handle. The pivoting handle would remain locked, necessitating continued access to the remote actuator, or access to the key in order to open the cover multiple times.

It would be advantageous to provide a remote locking and unlocking arrangement that, once actuated, would provide continued ability to open and close the truck cap or tonneau cover without repeated access to the remote actuator.

SUMMARY OF THE INVENTION

A locking assembly for a truck bed closure includes a closure/truck bed latch connectable member (1) movable in response to operator movement of an unlocked exterior handle to unlatch the closure from the truck bed and (2) externally lockable against such movement. An interior member has allowing and blocking positions respectively allowing and blocking such movement of the unlocked handle and latch connectable member, and is shiftable to its allowing position by unlocking and moving the exterior handle or by means inside the closed truck bed.

BRIEF DESCRIPTION OF THE DRAWINGS

FIG. 8 is a central cross-sectional view taken substantially on the line 8-8 of FIG. 7.

FIG. 8A is a central cross-sectional view taken substantially on the line 8A-8A of FIG. 8.

FIG. 8B is an enlarged pictorial view of the dog of FIG. 1.

DETAILED DESCRIPTION OF THE PREFERRED EMBODIMENT

Figure 1:
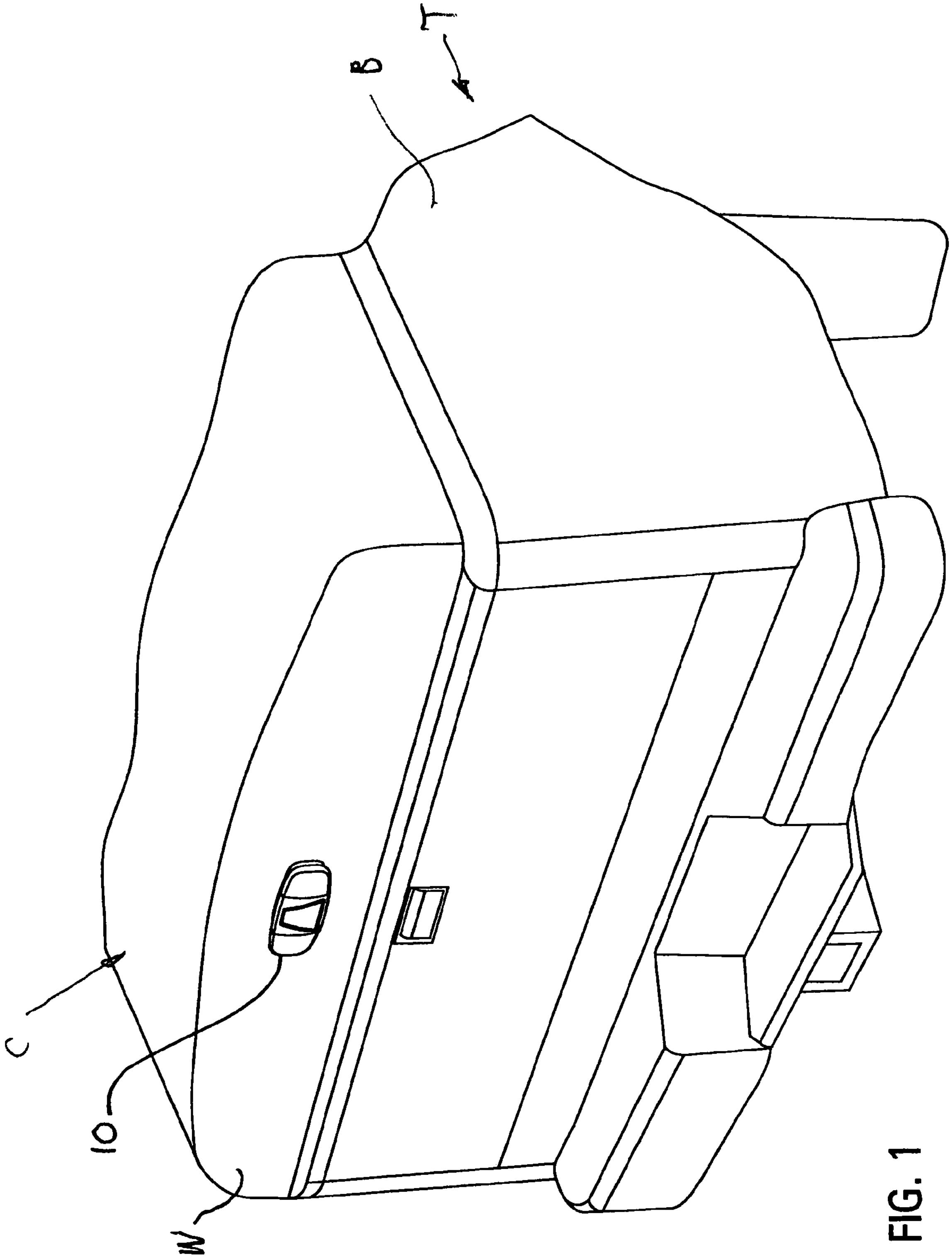
FIG. 1 is a pictorial view of truck cap with a cap locking assembly according to the invention.
Figure 2:
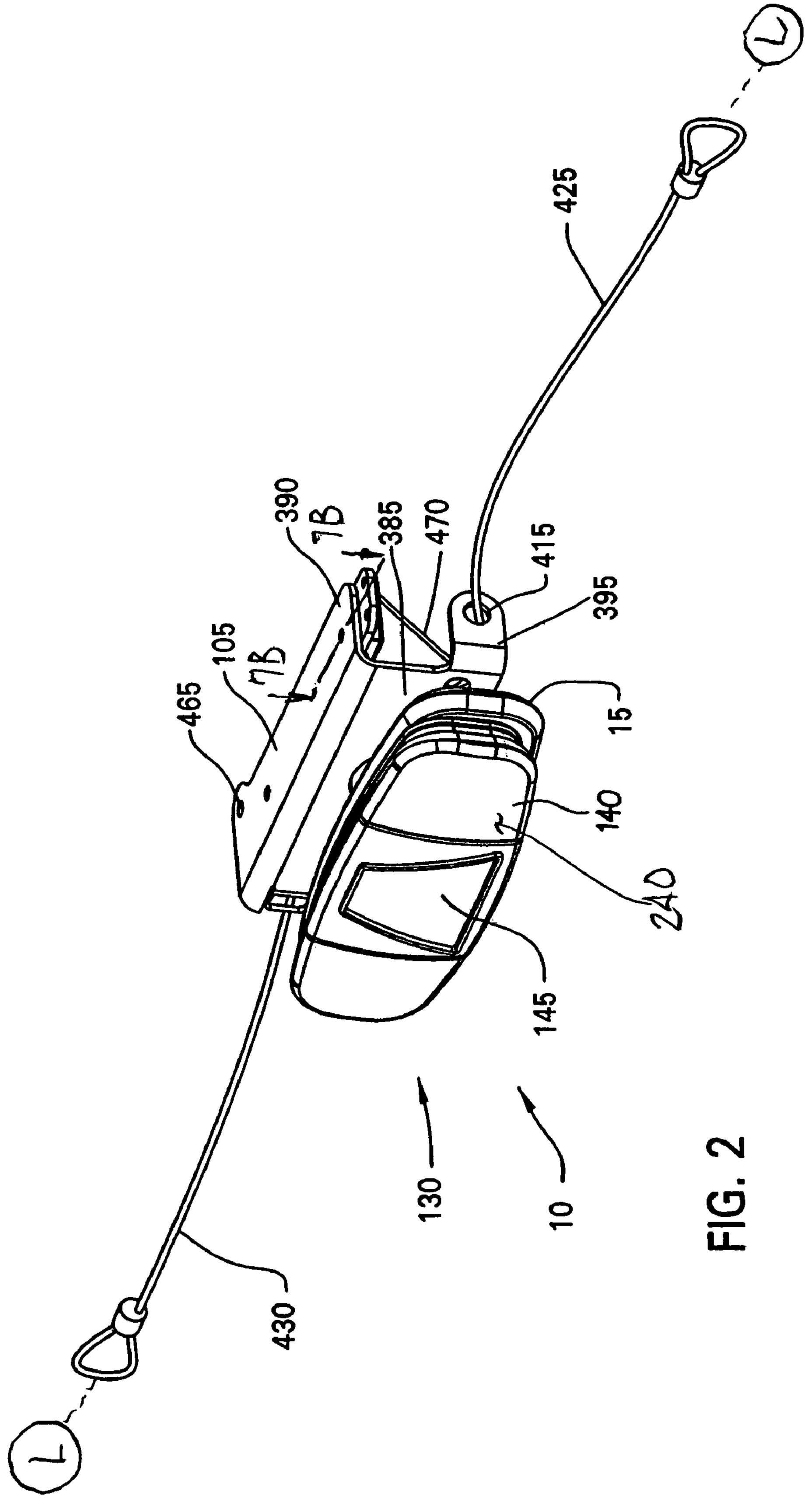
FIG. 2 is a pictorial view of the locking assembly of FIG. 1.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. The words "inboard" and "outboard" will refer to directions toward and away from the interior of a truck. Such terminology will include derivatives and words of similar import.

Figure 3A:
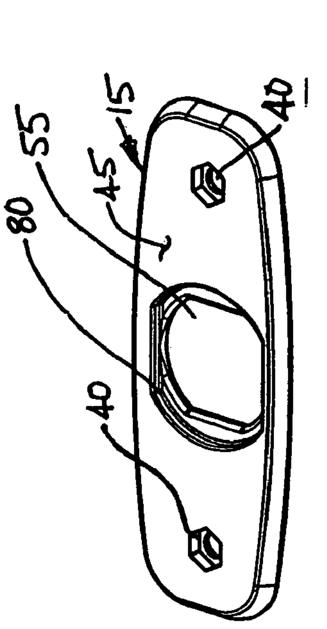
FIG. 3A is a pictorial view of a base plate of the locking assembly of FIG. 1.
Figure 3:
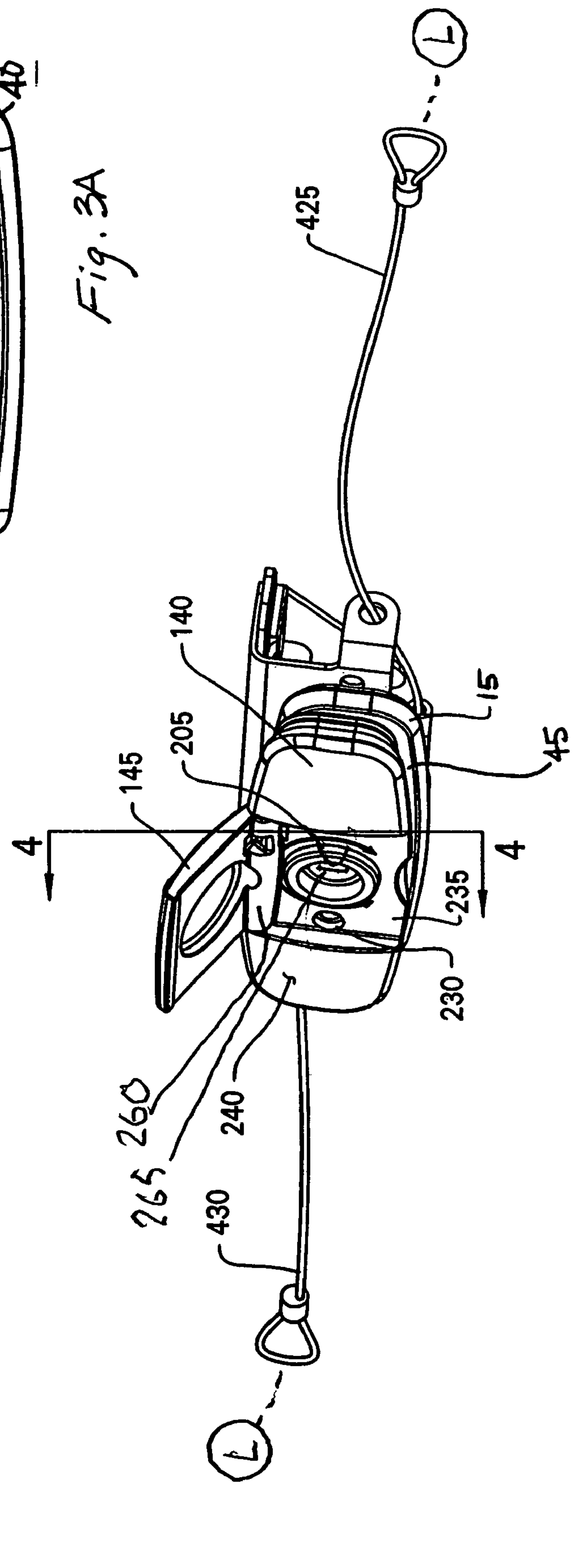
FIG. 3 is a pictorial view of the locking assembly of FIG. 1 with a keyhole cover open.
Figure 4A:
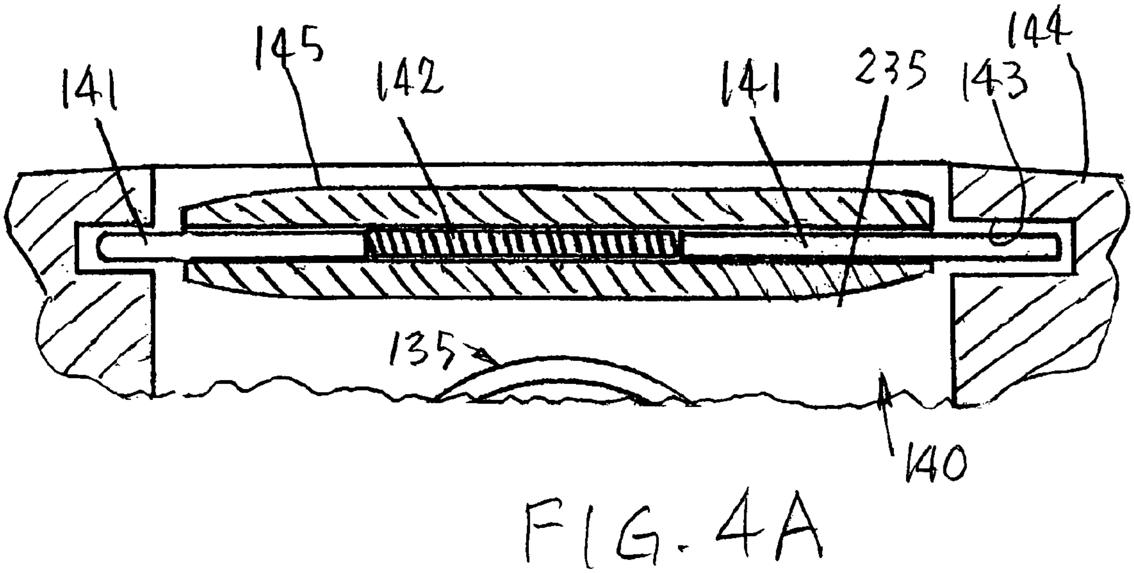
FIG. 4A is a fragmentary, schematic sectional view substantially taken on the line 4A-4A of FIG. 4.
Figure 4:
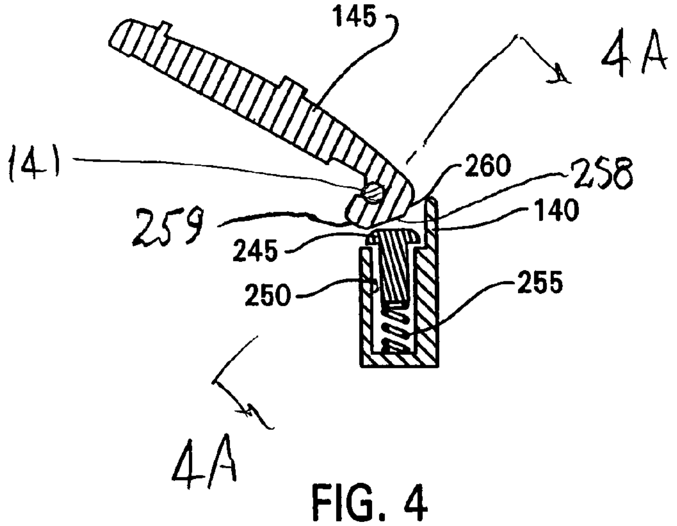
FIG. 4 is a cross-sectional view taken substantially on the line 4-4 of FIG. 3.

Referring to FIGS. 1-4 and 6, a truck T includes an open-top bed B selectively closable by a truck bed closure C (e.g. cap lift gate or tonneau cover) having a wall W mounting a locking assembly 10 according to the invention. The locking assembly 10 includes a base plate 15 mounted on the outside of the truck bed closure wall W by a pair of bolts 20, 25 (FIG. 6) extending through the wall W. The bolts have respective heads 30, 35 snugly and nonrotatably received in correspondingly shaped recesses 40 (FIG. 3A) in the face 45 of the base plate 15, such that the base plate 15 is thereby not removable from outside the truck bed closure. A gasket 50 (FIG. 6) is sandwiched between the outer face of the truck bed closure wall W and the base plate 15 to exclude moisture and provide a cushion effect. Holes 52 in the gasket, and corresponding holes in the truck wall W, receive the screws 20, 25.

As apparent from the foregoing, and readily seen in FIG. 8, the locking assembly parts located outside the closure C are the handle body 140, key lid 145, base plate 15, and gasket 50. The remaining locking assembly parts either extend into (through the wall W) or are entirely within the interior space bounded by the closed closure C and truck bed B.

Figure 6:
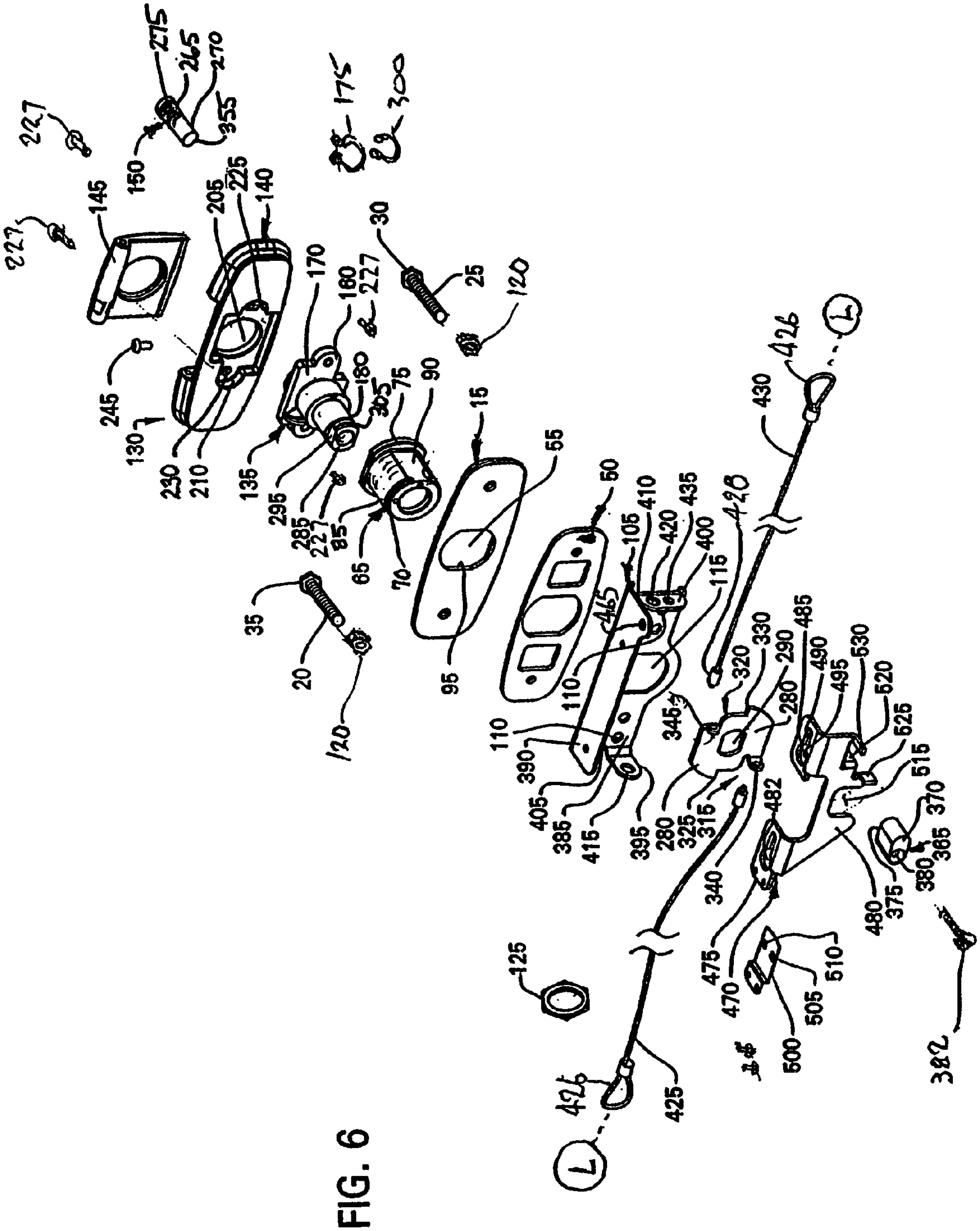
FIG. 6 is an exploded rear pictorial view of the locking assembly of FIG. 1.
Figure 6A:
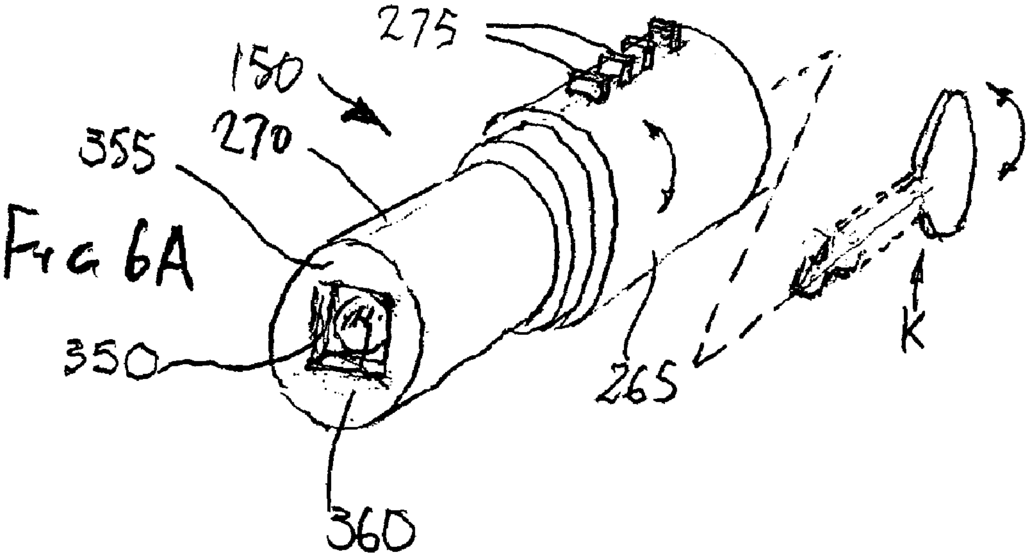
FIG. 6A is an enlarged pictorial view of the tumbler of FIG. 6.

The base plate 15 (FIGS. 3A and 6) is oblong and includes a central aperture 55. The central aperture 55 aligns with a corresponding aperture AW (FIG. 8) in the truck bed closure wall W, and is configured to receive a lock cylinder bushing 65 (FIGS. 6 and 8). The lock cylinder bushing 65 includes a hollow cylindrical portion 70 and a flange portion 75 at the outboard end of the cylindrical portion 70. The base plate 15 includes an outboard recess 80 around the central aperture 55, shaped and sized for snugly and nonrotatably receiving the flange portion 75. The cylindrical portion 70 is configured for snug, nonrotatable inserting through the base plate central aperture 55. The radially outer surface 85 of the cylindrical portion 70 includes diametrically opposed, convexly rounded, threaded surfaces (schematically shown in FIG. 6) circumferentially separated by diametrically opposed flat sections 90. The flat sections 90 align with like flat sections 95 of the central aperture 55 of the base plate 15 to rotationally fix the bushing 65 in the base plate 15.

A mounting frame 105 (FIGS. 6, 7A, 8 and 8A) is adapted to abut on an internal face 100 of the truck bed closure wall W and axially align with the base plate 15. The mounting frame 105 includes apertures 110 and 115 respectively configured to align with and snugly receive the bolts 20, 25 and bushing 65. Appropriately sized nuts 120, 125 are received respectively on the inboard ends on the bolts 20, 25 and bushing 65 to fix the base plate 15, gasket 50 and mounting frame 105 to each other and to the truck bed closure.

The locking assembly 10 further includes a handle assembly 130 (FIGS. 2, 3, 4, 6 and 8). The handle assembly 130 includes a shaft component 135, a handle body 140, a key lid 145, and a tumbler 150.

Figure 6B:
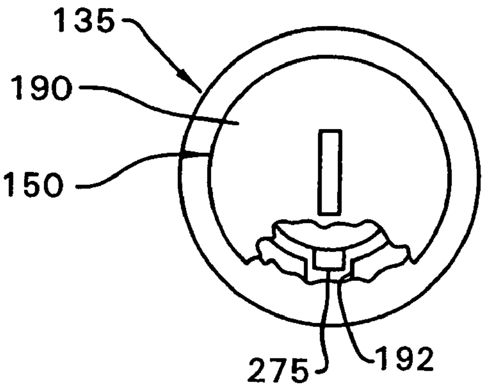
FIG. 6B is an enlarged, partially broken, elevational view of a fragment of FIG. 3.
Figure 6D:
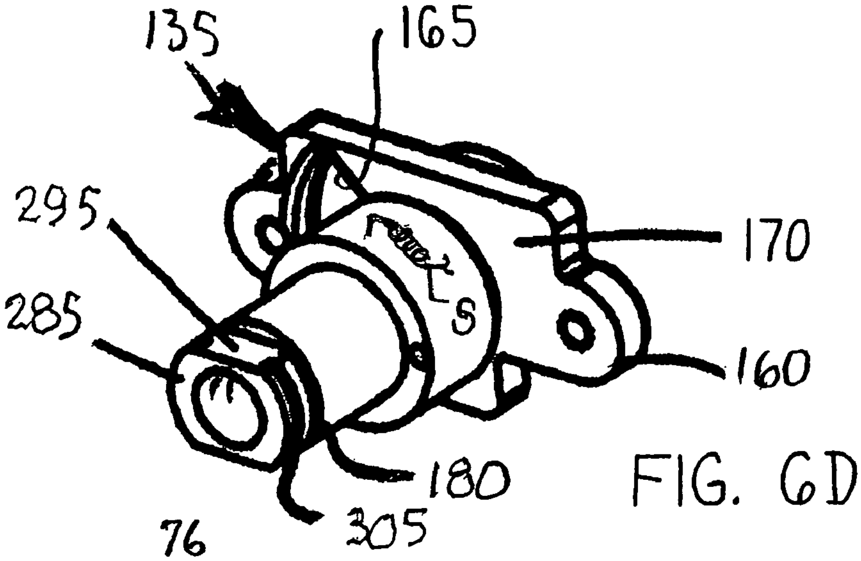
FIG. 6D is an enlarged pictorial view of the FIG. 6 bushing showing the outboard end thereof.
Figure 6C:
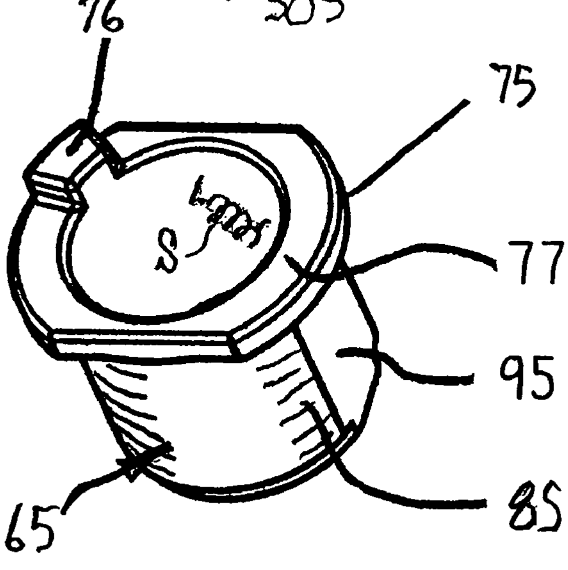
FIG. 6C is an enlarged fragment of FIG. 6.

The shaft component 135 (FIGS. 6 and 8) includes a hollow, stepped cylindrical body 155 and a radial flange 160 spaced intermediate the ends of the body 155. The hollow, stepped cylindrical body 155 is configured to be received in the hollow cylindrical portion 70 of the lock cylinder bushing 65, and is preferably rotationally spring biased by any conventional intervening resilient means (schematically indicated in FIGS. 6C and 6D). An outboard projection 76 (FIG. 6C) on the outboard end 77 of the bushing 65 is circumferentially movable in an annular groove 165 (FIG. 6D) in the inboard face 170 of the flange 160 of the shaft component 135. The groove 165 is circumferentially long enough to allow limited, e.g. 90°, rotation of the shaft component 135, the latter preferably being spring-biased to rest such projection against one end of such groove, so as to have a rest position of fixed orientation on the bushing 65. The shaft component 135 is retained in the bushing 65 by a spring clip 175 (FIG. 6) received in the first circumferential groove 180 (FIG. 6) around the hollow, stepped cylindrical body 155 adjacent its inboard end. The hollow cylindrical body 155 includes a stepped internal cavity 185 having an outboard opening key-cylinder portion 190 and an inboard extending tail portion 195. The key-cylinder portion 190 includes radially extending keyways 192 (FIG. 6B) for coaction with the tumbler 150 as hereafter described The handle body 140 (FIGS. 3, 4, 6 and 8) includes a central aperture 205 with an inboard-facing recess 210. The recess 210 is configured to receive the intermediate flange 160 of the shaft component 135 and the central aperture 205 is configured to receive the outboard portion of the hollow cylindrical body 155 of the shaft component 135. The shaft component 135 is fixed to the inboard face of the handle body 140 by any convenient means, such as small screws 227 (FIG. 6) inserted through holes in the tumbler flange 160 and threaded into opposing holes 225, 230 adjacent and flanking the central aperture 205 in the handle body 140. The handle body 140 is removable from the shaft component 135 without affecting the locking function of the locking assembly 10.

The handle body 140 further includes a central recess 235 (FIG. 3) in the outboard face 240 thereof, surrounding the central aperture 205.

The key lid 145 is pivotally mounted to the handle body 140, e.g. by coaxial half shafts 141 in the lid 145, outwardly urged by a spring 142 therebetween, into pockets 143 in portions 144 of the handle body 140 flanking the recess 235. The key lid 145 is configured to pivot from a closed position (FIG. 2), filling the central recess 235 on the outboard face 240 of the handle body 140 and covering the central aperture 205, to an open position (FIG. 3), projecting from the outboard face 240 of the handle body 140. The key lid 145 is resiliently biased toward its open and the closed positions by a camming pin 245 (FIG. 4) received within an internal cavity 250 of the handle body 140 and urged by a spring 255 into contact with cam flats 258 and 259 on the otherwise convexly rounded hinge portion 260 of the key lid 145.

The tumbler 150 (FIGS. 3, 6, 6A and 8) is of conventional type and includes an outboard key-lock portion 265 for receiving a key K and an inboard tail portion 270. The tumbler 150 is generally cylindrical and is configured for insertion into the hollow, stepped cylindrical body 155 of the shaft component 135. More particularly, the tumbler tail portion 270 is inserted through the key-cylinder portion 190 of the body 155 and to the inboard end of the tail portion 195 of the hollow, stepped cylindrical body 155. The key-lock portion 265 includes a number of radially extending pins 275 that orient the tumbler 150 for insertion into the keyway 192 (FIG. 6B) of the key-cylinder portion 190. The outboard key-lock portion 265 has an exterior key-receiving end in the handle body 140 and exposed to receive a conventional key K if the key lid 145 is in its open, FIG. 3, position.

Figure 5:
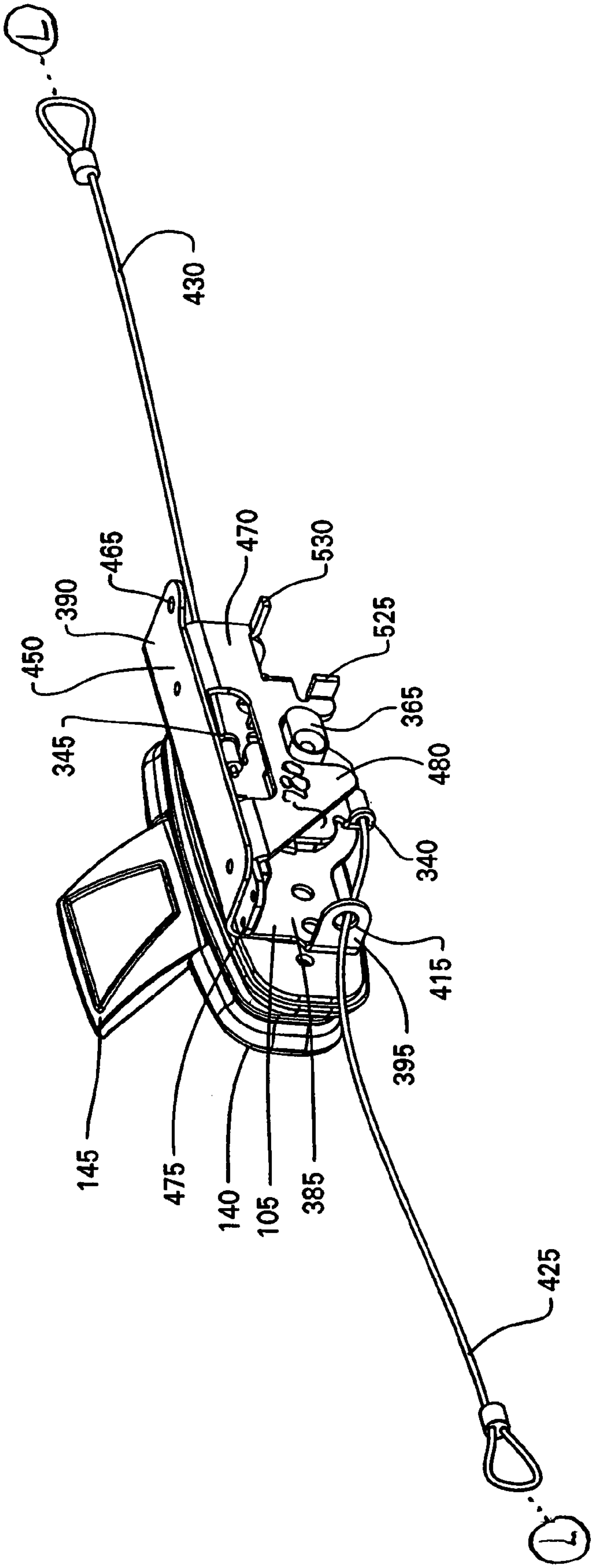
FIG. 5 is a rear pictorial view of the locking assembly of FIG. 1.

Referring to FIGS. 5, 6 and 8, with the handle assembly 130 fixed to the bushing 65 by the first spring clip 175, a lock disk 280 is coaxially fixed on the inboard end 285 of the shaft component 135 for rotation therewith and so with the handle body 140. In the embodiment shown, the inboard end portion of the shaft component has a non-circular cross-section, here including a pair of diametrically opposed flats 295. The lock disk 280 includes a noncircular, flatted, central aperture 290, correspondingly shaped and sized to be circumferentially fixed on the inboard end 285 of the shaft component 135. The lock disk 280 (FIGS. 6, 8 and 8A) is fixed on the shaft component 135 between the first spring clip 175 and a second spring clip 300 (FIGS. 6, 8 and 8A) received in a second circumferential groove 305 proximate the inboard end 285 of the shaft component 135. The spring clips 175 and 300 may be conventional, C-shaped snap rings.

The lock disk 280 (FIG. 6) is substantially planar and circular, but includes a number of outstanding features. The outer edge of the lock disk 280 includes a pair of diametrically opposed, semicircular cut-out sections (or notches)

315, 320. Respective radially outward extending ledges 325, 330 define one end of the corresponding cut-out sections 315, 320. Each ledge 325, 330 defines a disk rotation stop, as hereafter discussed. At the other end of the cut-out sections 315, 320 respective cable mount tabs 340, 345 extend perpendicular to the surface of the lock disk 280 away from the wall W. The lock disk 280 is rotationally symmetrical about its flatted central aperture 290.

The tail portion 270 (FIG. 6A) of the tumbler 150 includes a coaxial noncircular (here square) recess 350 in its interior (inboard) end 355, at the open end of a coaxial threaded aperture 360. The locking assembly 10 includes a locking dog 365 (FIGS. 3, 6 and 8) in the form of an oblong block 370 having on its outboard face an off-center projection 375 (FIGS. 8 and 8B) and a through aperture 380. The projection 375 of the dog 365 corresponds in shape (hence here square) and sized so as to be snugly received in, the square recess 350 of the tumbler 150, rotationally fixing the locking dog 365 to the tumbler 150. A screw 382 extends through the dog 365 and is threaded into threaded aperture 360 of the tumbler 150 to eccentrically fix the locking dog 365 on the end of the tail portion 270 of the tumbler 150.

The mounting frame 105 (FIGS. 6 and 7A) comprises an upstanding wall plate 385 and a horizontal shelf plate 390 fixedly extending inboard from the top of the wall plate 385 and substantially perpendicular thereto. The wall plate 385 is fixed to the interior face 100 of the truck bed closure wall W (FIGS. 6 and 8A) by the bolts 20, 25 through the wall plate holes 110, and their nuts 120, and by the bushing 65 through the wall plate hole 115, and its nut 125. Two vertical flanges 395, 400 (FIG. 6) extend from corresponding end edges 405, 410 of the wall plate 385. The vertical flanges 395, 400 include corresponding apertures 415, 420 configured for loosely guiding cables 425, 430 extending through holes in the cable mount tabs 340, 345 on the lock disk 280 to closure latches L hereafter discussed and whose location may vary widely from vehicle to vehicle. The flange 400 further includes a second, threaded aperture 435 below the aperture 420. Two laterally spaced studs 440, 445 fixedly depend from the lower surface 450 of the shelf plate 390, and have shanks 456 mounting correspondingly heads 455, 460. The shelf plate 390 also includes a threaded aperture 465 at its right inboard corner in FIG. 6.

The remote ends 426 of the cables are configured (here with loops 427) to engage and operate the latches L. The inboard ends of the cables include fixed stops 428 larger in diameter than the holes in the tabs 340, 345 so that the tabs can pull the cables and open the latches L upon counterclockwise (FIG. 6) rotation of the lock disk 280.

The locking assembly 10 further includes a slider 470 (FIG. 6) configured for movable connection to the mounting frame 105. The slider 470 is preferably formed of bent plate stock and includes a horizontal portion, here defined by a pair of laterally spaced shelves 475 and extending in an outboard direction from a vertical wall 480.

The horizontal shelves 475 (FIG. 6) of the slider 470 include a pair of respective keyhole apertures 482, 485, each having a narrow portion 490 and an enlarged portion 495. The keyhole apertures 482, 485 are spaced to align with the studs 440, 445 depending from the shelf plate 390 of the mounting frame 105. The heads 455, 460 of the studs 440, 445 can be inserted through the enlarged portion 495 (but not the narrow portion 490), and the stud shanks 456 fit slidably in the narrow portion 490, of the corresponding keyhole apertures 482, 485. So installed, the slider 470 can be shifted laterally so that the horizontal shelves 475 of the slider 470 are retained snugly against the bottom of the shelf plate 390 of the mounting frame 105 by the studs 440, 445.

A generally Z-shaped spring clip 500 has a base portion fixed (as by rivets) under one horizontal shelf (the leftward one in FIG. 6) 475 of the slider 470 and a downward stepped free portion vertically opposing the corresponding (leftward in FIG. 6) one of the keyhole apertures 485. The free portion of the spring clip 500 includes a pair of projections 505, 510 that resiliently engage the head 460 of the corresponding stud 445, to the resiliently block sliding of the slider 470 on the mounting frame.

The vertical wall 480 (FIG. 6) of the slider 470 includes a downwardly open locking cut-out 515. The locking cut-out 515 is generally rectangular, and is configured to receive and align with the locking dog 365 fixed on the tumbler 150. The vertical wall 480 of the slider 470 further includes a lock disk rotation stop 520, a manual actuation projection 525 and a motor-actuator projection 530, all extending horizontally and perpendicular to the vertical wall 480. The locking disk rotation stop 520 extends toward the wall plate 385 of the mounting frame 105 past the edge of the lock disk 280. The manual actuation projection 525 extends outwardly of the lock assembly 10 away from the wall plate 385. The motor-actuator projection 530 also extends outwardly of the lock assembly 10, away from the wall plate 385.

The preferred slider 470 here shown is linearly slidable. However, it is contemplated that an alternate slider may move arcuately, e.g. on a curved mounting frame or by rotation about the axis of the bushing 65.

Operation

Referring now to FIGS. 7-11, the locking assembly 10 is configured to pull open normally closed latches schematically shown at L. The latches are preferably of conventional type (e.g. like those shown in U.S. Pat. No. 6,354,650) operatively interposed between the closure C and truck bed B to normally block opening of the truck bed closure. In order to open the latches L, to allow opening of the closure C and access to the interior of the truck bed B, the cables 425, 430 attached to the lock disk 280 must be drawn inwardly. This is accomplished by rotating the lock disk 280 counterclockwise, from its FIG. 10 position to its FIG. 11 position.

Figure 7A:
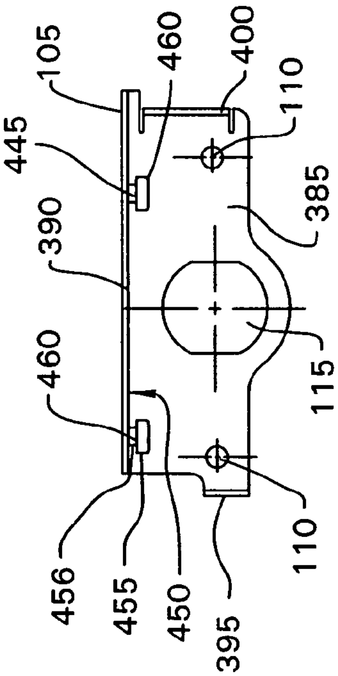
FIG. 7A is a rear elevation of a mounting frame of the locking assembly of FIG. 1.
Figure 7:
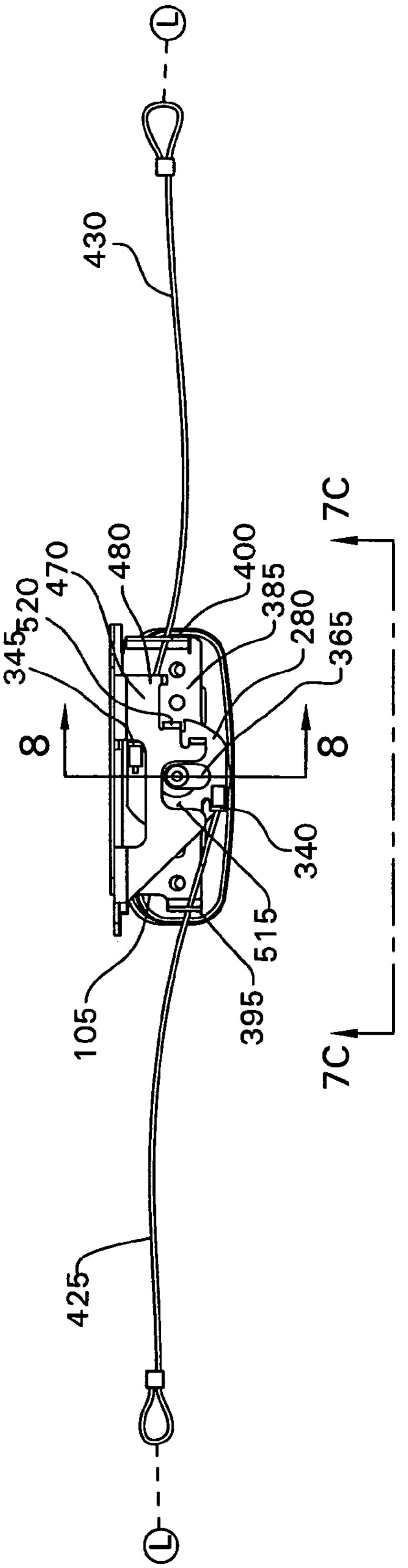
FIG. 7 is a rear elevation of the locking assembly of FIG. 1 in the locked position.
Figure 7B:
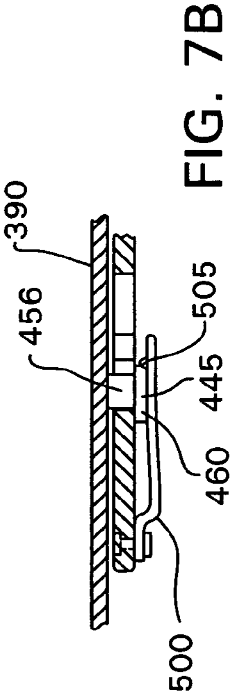
FIG. 7B is a fragmentary sectional substantially taken on the line 7B-7B of FIG. 2, with the spring clip and pin in relief.
Figure 7C:
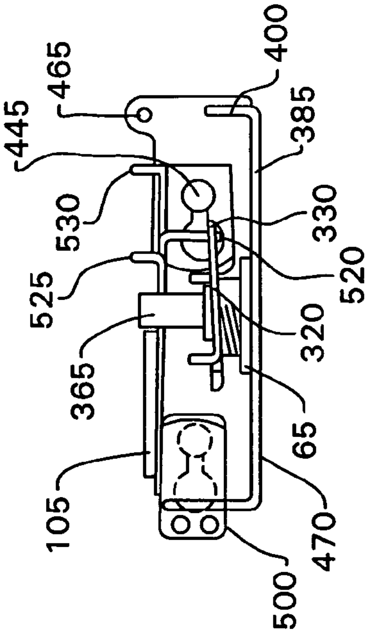
FIG. 7C is a fragmentary sectional view substantially taken on the line 7C-7C of FIG. 7.

FIGS. 7-8 show the locking assembly 10 in its “locked” position, wherein the locking dog 365 is oriented in a vertical position, and the slider 470 is shifted as far to the left (FIG. 7) as it will go. In this “locked” position, the lock disk rotation stop 520 (FIGS. 6 and 7C) is pulled into the notch 320 of the lock disk 280, so that the engagement of the ledge 330 of the lock disk 280 with the lock disk rotation stop 520 of the slider 470 prevents the lock disk 280, and thus the handle body 140, from rotating.

In order to rotate the lock disk 280, the slider 470 must be shifted to the right (FIG. 10) so that the lock disk rotation stop 520 is shifted away from and does not interfere with the lock disk 280.

Figure 9:
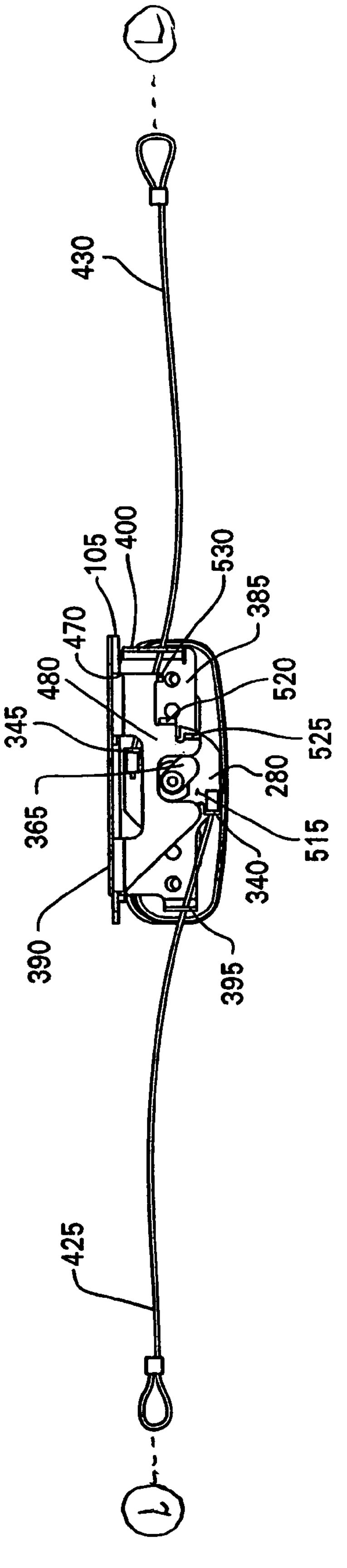
FIG. 9 is a rear elevation of the locking assembly of FIG. 1 in the unlocking condition.

Referring to FIG. 9, by rotation of the key K, the tumbler 150, and hence the locking dog 365, have been rotated counterclockwise from their FIG. 7 positions. As it rotates, the locking dog 365 cams against the side of the locking cut-out 515, forcibly shifting the slider 470 rightward to its FIG. 10 unlocked position. The user, who is turning the key K and rotating the tumbler 150, will realize the slider 470 has been fully shifted, due to the horizontal orientation of the key K and to the audible and tactile click of the spring clip 500 on the head 460 of the stud 445 (FIG. 7B) as the protrusions 505, 510 of the spring clip 500 resiliently snap over the stud head 460.

Figure 10:
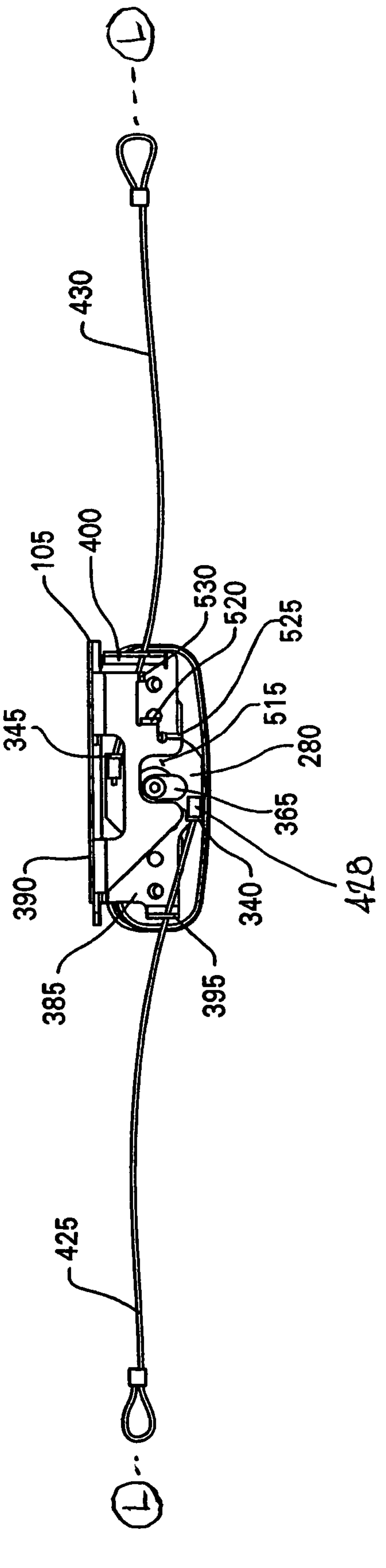
FIG. 10 is a rear elevation of the locking assembly of FIG. 2 in the unlocked position.

In their "unlocked" position of FIG. 10, the key K, tumbler 150 and locking dog 365 have been rotated back clockwise, to the original vertical position of the dog 365, and the key has been removed from the tumbler 150 to fix the tumbler 150 with respect to the shaft component 135. When the locking dog 365 is thus rotated back to its vertical position, the slider 470 remains in its rightward (in FIG. 10) "unlocked" position.

Figure 11:
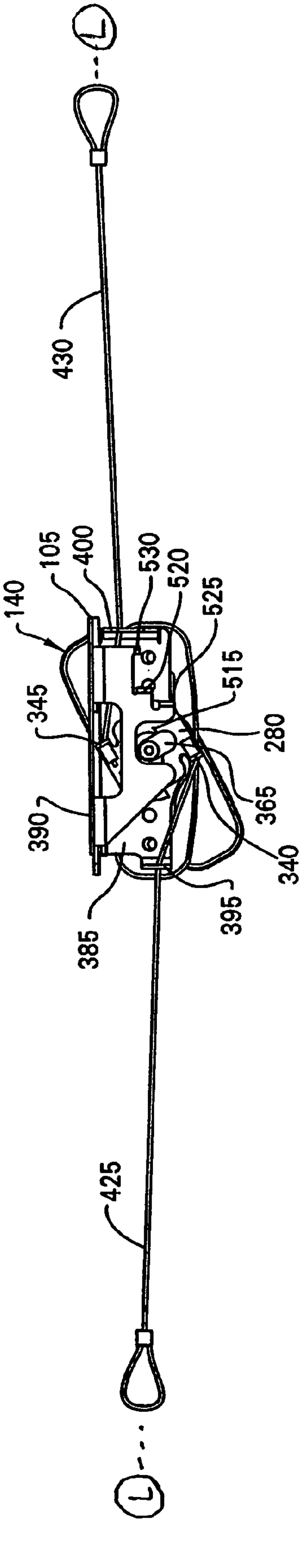
FIG. 11 is a rear elevation of the locking assembly of FIG. 1 in the unlatched condition.

The lock disk 280 is now free to rotate to draw the cables 425, 430 inwardly, counterclockwise from their FIG. 10 "latched" condition to their "unlatched" condition of FIG. 11. To that end, the user grasps and rotates counterclockwise the handle body 140, and thus the shaft component 135 and the lock disk 280 fixed on the shaft component 135.

Given the preferred spring bias above mentioned with respect to the projection 76 in the annular groove 165, the user need only release the handle body 140 to rotationally return it and the lock disk 280 to latter's latched (but still unlocked) position of FIG. 10. This ends tensioning of the cables 425 and 436 by the locking disk 280. The conventional latches L interposed between the closure and truck bed B are typically also spring-biased to help them return to their latched condition upon such release of the tension force transmitted by the cables 425, 430. Thus, the closure C is again latched to the truck body B.

To return the locking assembly 10 to its locked position of FIG. 7, the user inserts the key K in the tumbler 150 and rotates same in the opposite direction to lock the handle body 140 fixedly to the lock cylinder bushing 65, and cam the locking dog 365 against the left side of the locking cut-out 515, pushing the slider 470 to its leftward, FIG. 7, locked position. The user can then, again, remove the key from the tumbler 150, with the locking assembly 10 in its locked position, wherein the handle body 140 cannot be rotated.

Figures 12, 12A:
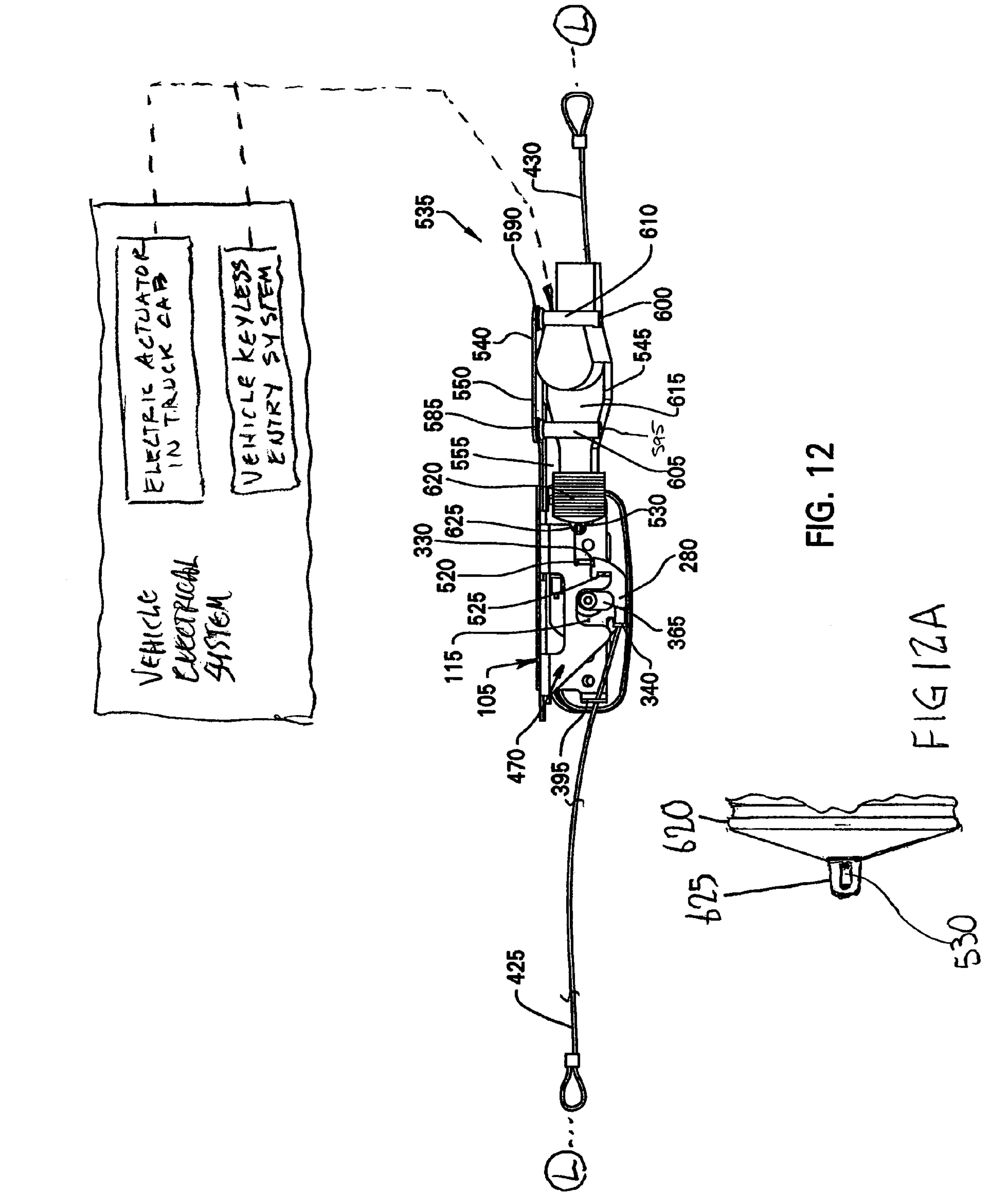
FIG. 12 is a rear elevation of a further embodiment of the locking assembly according to the invention with motor actuator and mount attached, in the locked position.
FIG. 12A is an enlarged fragment of FIG. 12.
Figure 13A:
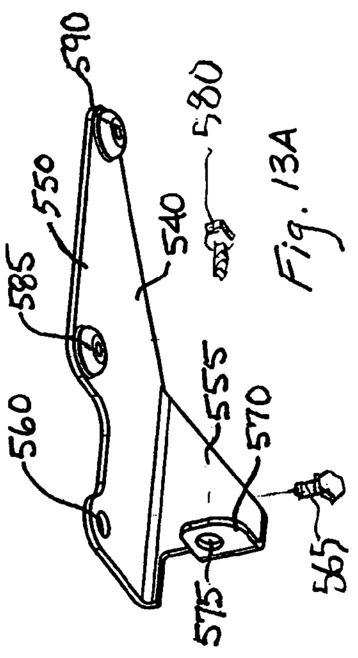
FIG. 13A is a rear pictorial view of an actuator-mounting bracket of the locking assembly of FIGS. 12-13.
Figure 13:
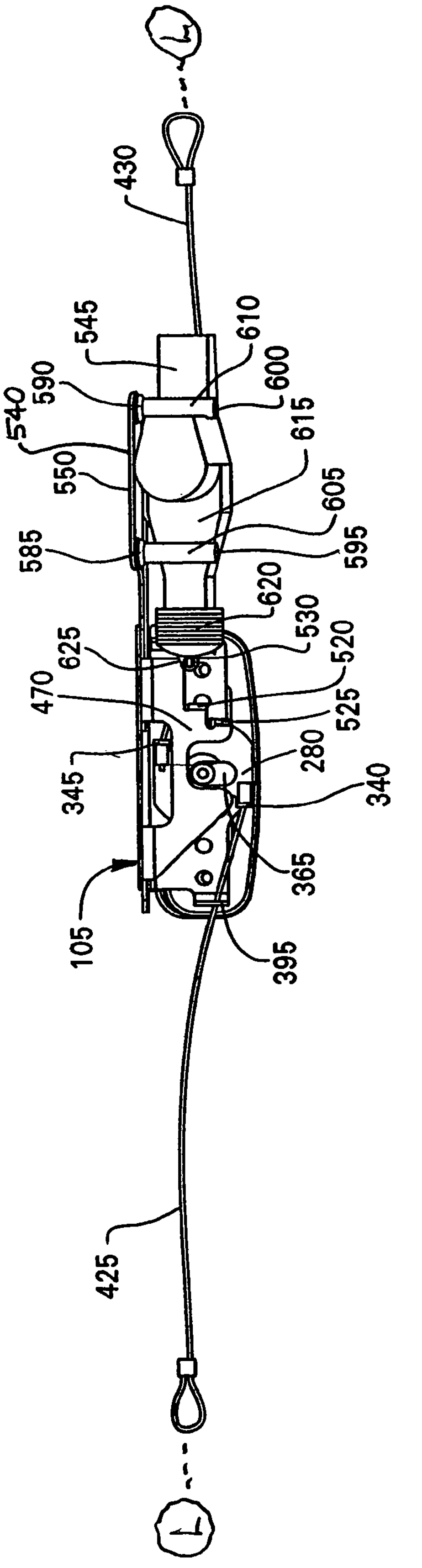
FIG. 13 is a rear elevation according to FIG. 12 in the unlocked position.

Further Embodiment of FIGS. 12-13

FIGS. 12-13 show a further embodiment comprising a locking assembly 535 which is preferably similar to the locking assembly 10 of FIGS. 1-11, except as follows. More particularly, the embodiment of FIGS. 12-13 adds an actuator-mounting bracket 540 and linear actuator 545 to the locking assembly 10 of FIGS. 1-11. The locking assembly 535 can be sold and installed as a unit, or the actuator-mounting bracket 540 and linear actuator 545 can be considered an optional, "add-on" module for installation onto the locking assembly 10 of FIGS. 1-11. The linear actuator is preferably a conventional, remotely electrically operated unit, e.g. a "Power Lock Actuator" available from Spall Advanced Technologies located at Correggio, Italy.

The actuator-mounting bracket 540 (FIG. 13A) includes a base plate 550 and a wall plate 555. The base plate 550 includes an aperture 560 configured for receiving a screw 565. The wall plate 555 supports an outwardly extending flange 570 having an aperture 575 configured for receiving a screw 580. The screws 565, 580 extend through the apertures 560, 575 of the base plate 550 and the flange 570 and are arranged for alignment with and threaded engagement in, the threaded apertures 435, 465 (FIG. 6) of the flange 395 and shelf plate 390 of the mounting frame 105, to fix the actuator-mounting bracket 540 to the mounting frame 105 as shown in FIGS. 12 and 13.

The actuator-mounting bracket 540 (FIG. 13A) further includes a pair of threaded apertures 585, 590 for threadedly receiving a pair of actuator-mounting screws 595, 600, which extend upward through sleeves 605, 610 (FIG. 13) in the body 615 of the linear actuator 545, to fix the linear actuator 545 to the actuator-mounting bracket 540. The linear actuator 545 includes a laterally extendable actuator arm 620 (FIGS. 12 and 12A having a loop/connector 625 at its free end. The actuator-mounting bracket 540 locates the linear actuator 545 on the mounting frame 105 so that motor-actuator projection 530 (FIGS. 6, 13 and 13A) of the slider 470 is received in the loop 625, the linear actuator 545 and the slider 470 being thereby functionally joined.

The actuator arm 620 of the linear actuator 545 is capable of being manually shifted, i.e. movement of the slider 470 in the manner described above, using the key, tumbler 150 and locking dog 365, will also shift the actuator arm 620 of the linear actuator 545. Conversely, the slider 470 can be shifted to the left or right, without the use of the key K, tumbler 10 or locking dog 365, as long as the locking dog 365 is in the upright position of FIG. 7 or FIG. 10. Therefore, the linear actuator 545 is actuable to shifting the slider 470 from the locked to the unlocked position and vice versa.

The linear actuator 545 can be configured for electrical connection to an original equipment manufacturer's vehicle electrical system, such as to a keyless entry part thereof and/or to a remote switch thereof, such as may be located in the cab of the truck. The linear actuator 545 can also be configured with an electronic controller to operate with a stand-alone keyless entry system. The linear actuator 545 does not interfere with the operation of the locking assembly 535 with the key K and, due to the configuration of the mounting frame 105 and actuator-mounting bracket 540, can be added to the locking assembly 10 subsequent to the original installation.

An additional operational mode of the locking assembly 10, 535 is provided by the manual actuation projection 525 (FIG. 6) of the slider 470. Some people may use their pickup trucks for camping, or may use the truck bed to catch a quick nap at a highway rest stop. Thus, Applicant recognizes that the possibility of locking and unlocking the truck bed closure from the inside is desirable. To that end, a person located in the interior of the truck bed can simply close the closure over him/herself and, by grasping the manual acuation projection 525, shift the slider 470 to the left, locking the locking assembly 10, 535 from the inside. Such person can thereafter unlock the locking assembly 10, 535 by shifting the slider 470 to the left and open the closure C to exit the truck. The locking assembly 10, 535 is still operable by key or remote electronic activation from outside should someone, e.g. a child, inadvertently be locked in.

While the invention has been described in the specification and illustrated in the drawings with reference to a preferred embodiment, it will be understood by those skilled in he art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A locking assembly for a truck bed closure member having a wall, the locking assembly comprising:

an interior mounting frame configured for attachment to an interior face of a truck bed closure member wall;

a rotatable handle assembly comprising an exterior handle and an interior rotatable shaft member and a tumbler rotatably mounted within the shaft member;

a lock disk attached to the shaft member;

a locking dog attached to the tumbler; and a slider movable with respect to the mounting frame between a locked position and an unlocked position, said slider including a lock disk engagement portion and a locking dog engagement portion, whereby rotation of the locking dog shifts the slider between said locked position and said unlocked position.

2. The locking assembly of claim 1, wherein the tumbler is secured in the shaft component by the locking dog and the locking dog is fixed to the tumbler for rotation therewith.

3. The locking assembly of claim 1, wherein the lock disk is fixed to the shaft member for rotation therewith.

4. The locking assembly of claim 1 wherein the slider is slidably mounted along a substantially linear path on said mounting frame.

5. The locking assembly of claim 4, wherein the slider further comprises an actuator engagement portion, and further comprising an electric actuator operably connected to the actuator engagement portion of the slider.

6. The locking assembly of claim 5, wherein the electric actuator has a stroke length corresponding to a range of slider movement between said locked position and said unlocked position.

7. The locking assembly of claim 6, wherein the locking dog and electric actuator are independently operative connected to the slider.

8. The locking assembly of claim 5, wherein the electric actuator has an electrical input electrically connectable to a vehicle electrical system.

9. The locking assembly of claim 1, wherein the slider further comprises a finger tab configured to enable manual movement of the slider between said locked position and said unlocked position.

10. The locking assembly of claim 1, wherein said handle assembly further comprises a handle member mounted to said rotatable shaft member.

11. A locking assembly comprising:

a slider having a dog-receiving aperture, a disk rotation flange and a manual actuation flange actuable by a person in a truck body to allow opening a truck body closure member;

a handle rotatable with respect to said slider;

a key rotatable locking dog having a camming portion disposed in said dog-receiving aperture and engageable with said slider; and a lock disk fixed with respect to said handle for rotation therewith, whereby rotation of said locking dog cams the slider between locked and unlocked positions respectively adjacent and remote from said disk.

12. The apparatus of claim 11 including a mounting frame fixable to a truck body closure member wall, said slider being slidably carried by said mounting frame, and an add-on bracket releasably fixed to said mounting frame, a linear actuator having a first part fixedly carried by said bracket and a second part reciprocable on said first part and releaseably attachable to an actuator engageable part on said slider, said linear actuator second part having first and second positions on said first part respectively corresponding to said slider locked and unlocked positions.

13. The apparatus of claim 12 in which said linear actuator is a power actuator and includes a motor actuable from a vehicle electrical system.

14. The apparatus of claim 12 in which said slider has a manually engageable part, said slider being shiftable between said locked and unlocked positions independent and alternately by said dog and said manually engageable part and said actuator engageable part.

15. The locking assembly of claim 11, further comprising a mounting frame having a wall plate with a cylinder-mounting aperture having a circular portion and a flat portion.

16. The locking assembly of claim 11, including a shaft fixing said disk to said handle and wherein said rotatable disk further comprises a central aperture configured for receipt on a noncircular portion of said shaft and a radially arranged stop, said stop engaging said disk rotation flange with said slider in said locked position, thereby blocking said disk from rotating.

17. A locking assembly comprising:

a slider having a dogreceiving aperture and a disk rotation flange;

a handle rotatable with respect to said slider;

a key rotatable locking dog having a camming portion disposed in said dog-receiving aperture and engageable with said slider;

a lock disk fixed with respect to said handle for rotation therewith, whereby rotation of said locking dog cams the slider between locked and unlocked positions respectively adjacent and remote from said disk, a mounting frame having a wall plate with a cylinder-mounting aperture having a circular portion and a flat portion; and a hollow lock cylinder bushing having an interior cavity and an external surface having at least one flat portion configured for engaging the flat portion of the cylinder-mounting aperture, and a shaft member rotatable in said bushing and fixing said handle to said disk.

18. For use on a closeable truck bed cargo cover including a latching assembly for securing the cargo cover in a closed position, a locking assembly configured to connect to the latching assembly by at least one elongate member and configured to release the latching assembly to enable opening of the cargo cover, the locking assembly comprising:

a mounting frame;

a handle assembly rotatably connected to said mounting frame and including a handle body, a shaft portion, and a key tumbler coaxial to said shaft portion;

a lock disk rotatably fixed on said shaft portion;

a locking dog rotatably fixed on said key tumbler; and a slide member slidably attached to said mounting frame, the slide member including a dog-receiving slot and a lock disk stop, said slide member having first and second positions on said mounting frame, said first position engaging said lock disk stop with said lock disk and said second position spacing said lock disk stop from said lock disk.

19. A locking assembly comprising:

a mounting frame having a wall plate with a cylinder-mounting aperture having a circular portion and a flat portion, and a shelf plate with a pair of mounting studs;

a slider having a vertical portion with a dog-receiving aperture, a disk rotation blocking flange, a manual actuation flange and a motoractuator flange, a horizontal plate with a pair of keyhole apertures configured for receiving the mounting studs, and a spring clip mounted parallel to the horizontal plate and over one of the key hole apertures for engaging one of the studs;

a hollow lock cylinder bushing having an interior through passage and a threaded external surface, the threaded surface having at least one flat portion configured for engaging the flat portion of the cylinder-mounting aperture, the bushing having an external face and an internal face;

a hollow shaft rotatably received in the interior passage of the bushing, said shaft having an exterior end mounting the handle and an interior end having a noncircular portion, said shaft including an internal through passage;

a tumbler having an external key-receiving end and an internal insertion face, said tumbler being slidably received in the shaft internal through passage and extending therein from the external face of the cylinder bushing;

a locking dog fixed to the internal insertion face of the tumbler and engaging the dog-receiving aperture of the slider; and a disk having a noncircular central aperture circumferentially fixedly receiving noncircular portion of the shaft, a radially arranged stop, and a latch actuator mount, wherein the rotation of the tumbler within the shaft cylindrical aperture forces the locking dog to shift the slider to one of a locked and an unlocked position, the locked position of the slider abutting the disk rotation blocking flange with said stop on said disk rotation.

20. In a locking assembly, for operating a latch operatively interposed between a truck body and a truck body closure member including a wall, the combination comprising:

an exterior handle body locatable outside a truck body closure member wall;

a key actuable tumbler having an exteriorly facing key receiving portion in said handle body;

a key lid pivoted on said handle body between an open position exposing said key receiving portion and a closed position covering said key receiving portion;

a pivot shaft pivotally mounting said key lid on said handle body;

relatively angled camming faces and an interposed convexly protruding portion fixed on said key lid and circumferentially arranged around said pivot shaft;

a camming pin on said handle body adjacent said pivot shaft and a resilient member urging said camming pin from a retracted position toward an extended position, said pin having a portion resiliently biased against and riding on said first and second camming faces respectively in said key lid open and closed positions and on said protruding portion between said key lid open and closed positions; and latch operating structure operatively connected to said handle body and tumbler.

21. The apparatus of claim 20 in which said pivot shaft comprises coaxial stub shafts flanking a compressible spring in said key lid, said handle body having recesses receiving opposite ends of said stub shafts, at least one said stub shaft having a position retracted against said spring and out of engagement with said handle body, to allow changing of key lids on said handle body.

22. The apparatus of claim 20 in which said locking assembly has a manually engageable exposed portion and a latch engageable protected portion respectively locatable outside and inside a truck body cover member wall, said manually engageable exposed portion including said handle body and said key receiving portion of said tumbler, said latch engageable protected portion including an interior portion of said tumbler and a shaft member rotatable with said handle body.

23. In a locking assembly, for operating a latch operatively interposed between a truck body and a truck body closure member including a wall, the combination comprising:

an exterior handle body locatable outside a truck body closure member wall;

a key actuable tumbler having an exteriorly facing key receiving portion in said handle body;

a shaft component having an exterior end portion releasably fixed to the said handle body for rotation therewith;

releasable fasteners extending from an exterior face of said handle body to said shaft component exterior end portion and releasably fixing said handle body to said shaft component exterior end portion, said shaft component coaxially surrounding and being operatively connected to said tumbler, said handle body and shaft component being fixed with respect to said tumbler in a locked position of said locking assembly and pivotable coaxially with respect to said tumbler in an unlocked position of said lock assembly;

said locking assembly having a manually engageable exposed portion and a latch engageable protected portion respectively locatable outside and inside a truck body cover member wall, said manually engageable exposed portion including said handle body and said key receiving portion of said tumbler, said latch engageable protected portion including an interior portion of said tumbler and in an interior portion of said shaft member, and further including latch engageable structure operatively connected with said tumbler and shaft member;

such that exterior removal of said releaseable fasteners allows said handle body to be removed from outside a truck bed closure member and substitution of a different one therefor, but with said tumbler in its said locked position, unauthorized removal of said handle body still leaves said shaft component fixed to said tumbler and said latching assembly locked.

24. The apparatus of claim 23 including a lock disk nonrotatably fixed on said shaft component, and elongate dog releaseably fixed to the interior end of said shaft component and extending eccentrically therefrom and radially overlapping said lock disk, an interior mounting frame having a hole through which said shaft component extends, said hole being smaller than said lock disk, and a bushing through which said shaft component rotatably extends and having a threaded outer periphery, a nut threaded on said threaded outer periphery and extending radially beyond said hole in said interior mounting frame to prevent unauthorized exterior removal of said shaft component from a trailer bed closure member wall.

25. A locking assembly for a truck bed closure member comprising a wall, the locking assembly comprising:

an interior mounting frame configured for attachment to an inside face of a truck bed closure member wall;

an exterior handle body;

a shaft component having an exterior end fixed to said handle body;

an exterior base plate disposed inboard of said shaft component exterior end and fixed by bolts to said interior mounting frame, said base plate and mounting frame having holes through which said shaft component extends, said shaft component having an exterior part spaced beyond said hole in said mounting frame;

a latch operating member fixed on the interior part of said shaft component, said bolts having heads recessed in and rotationally locked in an exterior face of said base plate to prevent loosening of said bolts from outside a truck bed closure member wall.

26. The apparatus of claim 25 in which the base plate exterior face has recesses sized and shaped to conform to the periphery of said bolt heads, said bolt heads being substantially flush with said exterior face of said base plate, the periphery of said bolt heads being noncircular in shape.

* * * * *